A. D. RAMSEY.
TIRE ARMOR.
APPLICATION FILED FEB. 27, 1918.
1,290,781.
Patented Jan. 7, 1919.
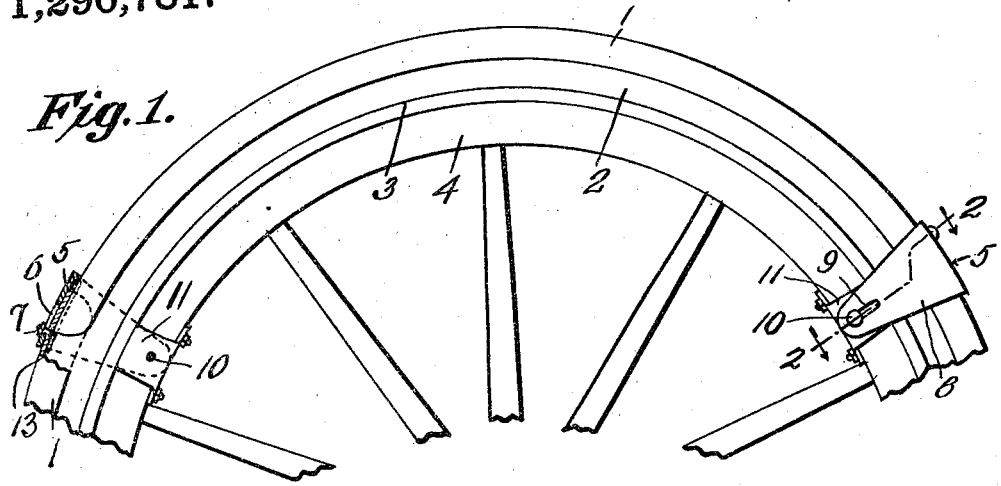
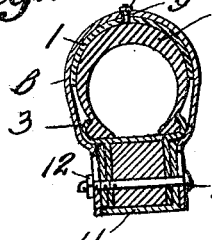
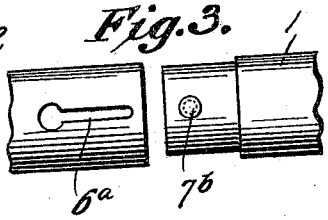
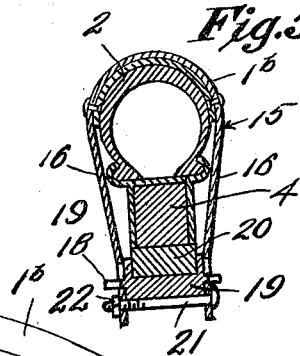
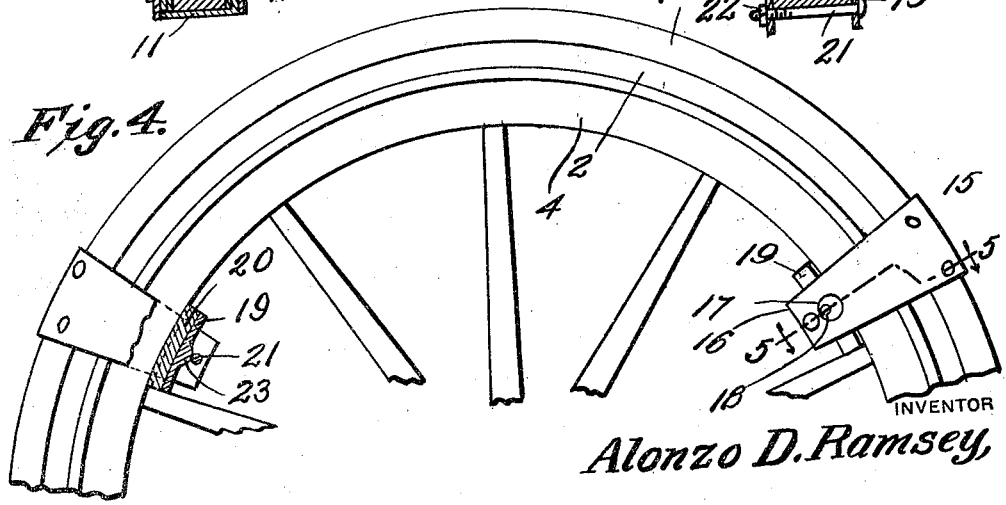
INVENTOR
Alonzo D. Ramsey,
WITNESSES
James F. Crown,
H. H. Babcock
BY Richard Owen,
ATTORNEY

UNITED STATES PATENT OFFICE.

ALONZO D. RAMSEY, OF SEDALIA, TENNESSEE.

TIRE-ARMOR.

1,290,781.  Specification of Letters Patent.  Patented Jan. 7, 1919.

Application filed February 27, 1918. Serial No. 219,478.

*To all whom it may concern:*

Be it known that I, ALONZO D. RAMSEY, a citizen of the United States, residing at Sedalia, in the county of Hancock and State of Tennessee, have invented certain new and useful Improvements in Tire-Armors, of which the following is a specification.

This invention relates to tire protectors, and more particularly to an armor of the rigid type adapted to be mounted about a pneumatic tire.

One of the main objects of the invention is to provide an armor which will completely inclose the tread portion of a tire so as to effectually protect the same, this armor being so mounted as to adjust itself to distortion of the tire under the influence of the load. A further object is to provide a tire protector of the character stated composed of a plurality of sections which are connected together and to the wheel on which the tire is mounted by universal connections so as to permit relative movement between the sections of the protector. Further objects will appear from the detailed description.

In the drawings:

Figure 1 is a fragmentary side view of a tire armor constructed in accordance with my invention, as applied, being partly shown in section, Fig. 2 is a section taken substantially on line 2—2 of Fig. 1, Fig. 3 is a fragmentary top plan view of a modified form of connection between two of the armor sections, Fig. 4 is a fragmentary side view of a modified form of the protector as applied, Fig. 5 is a section taken substantially on line 5—5 of Fig. 4.

In the form illustrated in Figs. 1 and 2, the armor is composed of the segmental sections 1 which are of arcuate cross section to fit about the tread portion of the tire 2 secured in rim 3 carried by the felly 4 of the wheel. Each section 1 is provided at one end with a substantially U-shaped securing clip 5 which is adapted to project inwardly about a tire and the lateral faces of felly 4. Clip 5 is provided, in the portion thereof which is passed about the tread portion of the tire and protector, with a transverse slot 6 positioned at the center of the tread portion of the protector. This slot is adapted to receive a stud 7 which is secured to the adjacent end of the preceding section 1, each section being provided with the clip 5 at one end and the stud 7 at the other end. The arms 8 of clip 5 project inwardly across the lateral face of the felly 4, and each arm is provided in its inner end portion with a longitudinal slot 9. These slots are in alinement transversely of the felly and receive a securing bolt 10 which is passed through the slot and the alined openings in the wear clip 11 secured to the felly and the depending arms of the rim and the felly. A suitable nut 12 is secured on the threaded end of the bolt. The slotted arms of clip 5 coöperate with the bolt 10 to loosely secure the ends of the adjacent sections 1 of the protector to the felly so as to permit movement of the ends of these sections radially of the wheel. In addition, the stud 7 and slotted clip coöperate to permit relative movement between the ends of the adjacent sections circumferentially of the wheel thus permitting the protector to expand and contract in accordance with distortion of the tire 2. By this construction, the protector may be formed of a plurality of segmental sections which are rigid and have sufficient strength and thickness to stand the wear to which they are subjected, these sections fitting completely about the tread portion of the tire so as to effectually protect the same, the protector thus produced readily accommodating distortion of the tire and not in any way interfering with or reducing the resiliency thereof. If desired, a protector 13 or shield may be mounted about the tread portion of the tire beneath the joint between the ends of adjacent sections 1 thus effectually eliminating all possibility of wear or cutting of the tire at this point. I do not deem this protector or shield essential to the invention, as there is very slight danger of cutting the tire from the adjacent ends of the sections, though this member can be provided if desired.

In Fig. 1 of the drawings, I have shown the studs 7 as having their outer ends threaded to receive securing nuts $7^a$, the stud projecting a short distance through this nut to form a traction gripping member. Also, if desired, the outer surfaces of sections 1 may be toothed for traction gripping purposes. In Fig. 3, the slot 6 is replaced by a bayonet slot $6^a$ which is adapted to receive a headed stud 7 carried by the adjacent section 1, the adjacent ends of the sections being thus slidably secured together in the same manner as in the form illustrated in Figs. 1 and 2.

In the form illustrated in Figs. 4 and 5 the armor is composed of a plurality of sections 1<sup>b</sup>, the adjacent ends of which are rigidly secured in U-clips 13 which fit about the rim and felly of the wheel. The sections 1<sup>b</sup> thus form in effect, a continuous rigid armor which fits about the tread portion of tire 2. The arms 16 of clip 15 are each provided, adjacent its inner end, with a circular aperture 17. These apertures are in alinement transversely of the clip and receive loosely the short trunnions 18 which project from the sides of a cradle block 19, provided on its under face with a rounded transverse lug 23 from which the trunnions project, this lug serving to reinforce the central portion of the block. Block 19 is longitudinally slotted to receive a cushion block 20 of wood, or other suitable material, which is held in engagement with the inner face of felly 2, the arms 16 of the clip being of such length so as to normally hold the block 19 in this position. The inner end of the arms are secured together by means of a bolt 21 inserted therethrough being beneath the block and a nut 22 threaded on this bolt, the rounded lug 23 serving to prevent interference by the bolt with the rocking movement of the block. The cradle block 19 and clip 15 thus coöperate to provide a mounting for the continuous rigid armor which permits limited movement of this armor in any direction thus accommodating distortion of the tire, the tread portion of the tire being completely incased so as to be effectually protected by the armor against puncture or wear. This armor, because of its rigidity and the manner in which it is mounted about the wheel, may be made of sufficient thickness to stand the wear to which it is subjected when in use.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:—

1. The combination with a wheel and a tire mounted thereon, of an armor mounted about the tread portion of the tire so as to completely inclose the same, U-clips secured to said armor and having their arms projecting inwardly beyond the inner face of the felly of the wheel, and means for securing said clips to the felly of the wheel by universal connection so as to permit independent movement of the armor in any direction radially of said wheel.

2. The combination with a wheel and a tire carried thereby, of an armor composed of a plurality of arcuate sections having their end portion disposed in overlapping relation, U-clips secured to the end portions of said sections and serving to secure the same together, and means for securing the arms of said clips to the felly of the wheel by universal connection so as to permit independent movement of said armor radially of the wheel.

3. The combination with a wheel and a tire carried thereby, of an armor fitting about the tread portion of the tire so as to inclose the same, a plurality of U-clips secured to said armor and having their arms of such length as to project inwardly beyond the inner face of the felly of the wheel, cradle blocks carried by said U-clips and provided with laterally projecting trunnions, the arms of the clips being provided with enlarged circular openings for receiving these trunnions so as to establish universal connection between the blocks and said arms, and means for forcing the inner end of the arms of said U-clips toward each other and for securing them in operative position so as to retain said cradle blocks in operative position within the clips.

In testimony whereof I affix my signature in presence of two witnesses.

ALONZO D. RAMSEY.

Witnesses:
 HENRY RAMSEY,
 MOSSIE M. LOUTHEN.

Copies of this patent may be obtained for five cents each, by addressing the "Commissioner of Patents, Washington, D. C."